Patented July 23, 1929.

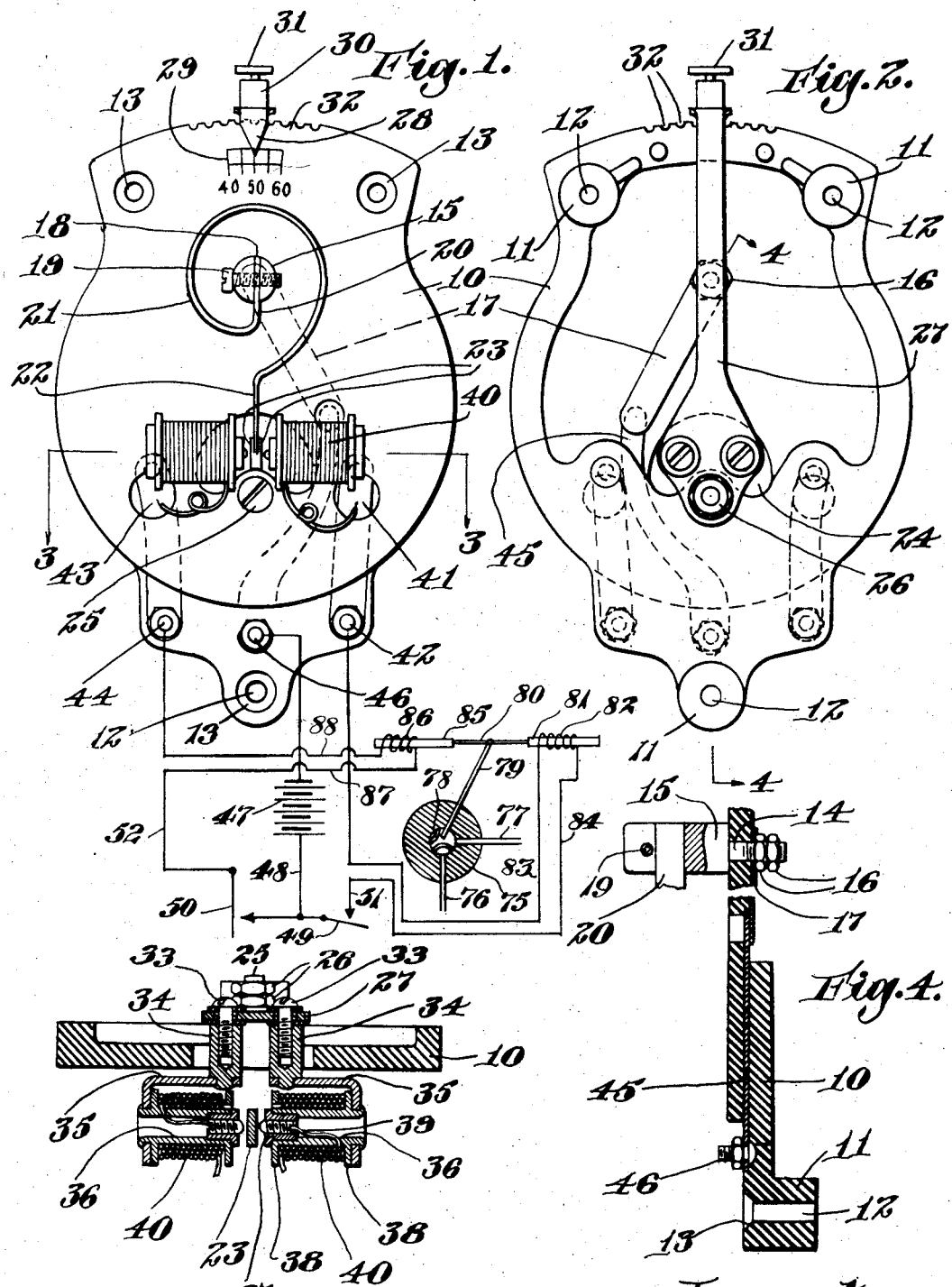

1,722,186

UNITED STATES PATENT OFFICE.

EUGENE T. VINCENT, OF BOSTON, MASSACHUSETTS.

THERMOSTAT.

Application filed April 16, 1924. Serial No. 706,840.

My present invention relates to thermostats, and more particularly to an improved and adjustable thermostat for use in connection with heating systems.

In heating systems where a heating apparatus is designed to be controlled in its operation by the changes in temperature of the room or other enclosure which it is desired to heat, it is necessary that some thermostatic device be located in such room or enclosure and which device will not only positively and accurately control the operation of the heating plant, but also such thermostatic arrangement must be capable of being easily and accurately adjusted. Particularly is this true in connection with heating apparatus adapted for use in heating garages, isolated rooms, or the like, where it is essential that the device not only be accurately operated, but also positively operated. In this class of devices, considerable difficulty has been experienced heretofore in producing a thermostatic device that will operate under all conditions of service, it having been found that such devices, while accurate in themselves, are so constructed as to defeat the very object for which they were produced. For example, in a thermostat designed for closing a circuit to produced certain operations in the heating plant, it is the invariable custom to close such circuit or circuits by means of contacts carried by the movable arm of the thermostats and as the arm of the thermostat moves from, say, the highest point to which it is set toward the lowest point and as it approaches such lowest point, it will also approach the contact to enable it to close a circuit for a specific purpose. It may be that the temperature will remain slightly above the minimum point so as to hold the thermostat arm almost, but not quite, in engagement with the contact. The variations of the thermostat arm so closely adjacent to the contact point has the effect, practically, of introducing an extremely high resistance in the circuit which may or may not close, but at any rate the contact points are burned or frittered away and, in a great many instances, the contacts freeze together with the result that the entire apparatus is put of commission. Again, in adjusting a contact point relative to the arm of the thermostat, it has been customary to move such contact point bodily toward and from the thermostat arm and it has heretofore been impossible, so far as I am aware, to perform this operation accurately.

I have, in my present invention, overcome the defects and difficulties above enumerated and have designed a thermostat in which the danger of intermittently opening and closing the circuit with the attendant danger of freezing contacts is positively eliminated, and also in which a new and novel device for adjusting the upper and lower limits of operation of the device is provided.

The principal object of my invention, therefore, is an improved automatically operating thermostat.

Another object of my invention is an improved thermostat in which electric circuits associated therewith are positively operated.

A further object of my invention is an improved thermostat having new and novel means for adjusting the upper and lower limits thereof.

Other objects and novel features of the construction and arrangements of parts comprising my device will appear as the description of the invention progresses.

In the accompanying drawings,

Fig. 1 is a front elevation of a thermostat showing the preferred embodiment of my invention;

Fig. 2 is a rear elevation of Fig. 1;

Fig. 3 is a sectional plan view on the line 3—3 of Fig. 1, and

Fig. 4 is a vertical sectional elevation on the line 4—4 of Fig. 2.

Referring to the drawings, 10 designates a body member of insulating material such as black rubber, bakelite, or the like, provided with posts 11 on the rear face thereof and through such posts 11 are holes 12. The holes 12 pass also through the main body 10 and on the front face of such body such holes are countersunk as indicated at 13. These holes 12 are arranged as shown in order to properly secure the body member 10 to a wall or other support and the posts 11 are of sufficient length to provide space enough in the back of the device for mechanism to be hereinafter described.

Passing through a perforation in the main body 10 is the reduced threaded end 14 of a support 15, nuts 16 being screwed onto such threaded portion 14 to securely hold the support 15 in position. Between the back of the body member 10 and the innermost nut 16 is secured a plate 17 of conducting material for the purpose to be hereinafter described. The support 15 is slotted, as indicated at 18, and through the slotted end is placed a screw 19. Fitting in the slot 18 is one end 20 of a thermostat element 21, the screw 19 serving to hold the portion 20 of the thermostat element 21 firmly in position in the support 15. The thermostat element 21 curves around, as shown in Fig. 1, and the lower portion thereof is straight, as shown at 22, and to such straight portion and on either side thereof is secured by brazing, welding, or in any other suitable manner, contact plates 23 of any magnetic material, these contact plates 23 lying in front of an arcuate cut out portion 24 in the body 10.

Mounted in the body 10 is a bearing screw 25 and on the rear portion of such bearing screw 25 is secured by nuts 26 an upwardly extending arm 27, the upper end of this arm being folded over and thence downwardly in front of the body 10, this portion in front of the body 10 acting as a pointer or indicating hand 28 and registers with graduations 29 cut in the front face of the body. Secured to the upper end of the arm 27 is a member 30 in which is yieldingly held a spring pressed member 31 which cooperates with teeth 32 cut in the upper edge of the body 10 and which member serves to hold the pointer 28 in registry with one or the other of the divisions of the scale 29. Secured to the front of the arm 27 by screws 33 are supports 34 which extend through the arcuate slot 24 to a point slightly beyond the front face of the body 10, as clearly shown in Fig. 3. To each of the supports 34 is secured, by riveting or in any other suitable manner, an angle member 35 and to the angle members 35 are secured by riveting, or in any other suitable manner, magnet spools 36, the axes of which are in alinement with each other, as clearly shown in Figs. 1 and 3. The magnet spools 36 are comprised of a hollow core member in the ends of which remote from the angle members 35 are secured internally threaded members 37, this core being also provided with heads 38. Screwing into the internally threaded members 37 from the outer ends thereof are screws 39 preferably of silver or like material. Energizing coils 40 are provided on each of the spools 36 and one end of each of said coils is attached or connected to the respective screw 39 associated with the core 36. Referring to Fig. 1, the right hand winding 40 has the end that is not connected to the screw 39 connected to one end of a conducting strip 41 which is embedded in the material of the body 10 and is provided with a binding post 42. The energizing coil of the left hand winding, as viewed in Fig. 1, has the end that is not connected to the screw 39, connected to a conducting plate 43 that is embedded in the material of the body 10 and this plate is provided with a binding screw 44. Embedded in the material of the body 10 is a plate 45 of conducting material, one end of which is in engagement with the conducting strip 17 and the other end is provided with a binding post 46.

The binding post 46 is connected to one terminal of a battery or other suitable source of power 47. Connected to the other terminal of the battery is the conductor 48 which has attached to its other end for convenience of showing the switch arms 49 and 50 respectively. The switch arm 49 is associated with a contacting point on one end of a conductor 51, the other end of such conductor being connected to the binding post 42 and therefore to one end of the right hand energizing coil 40. The other switch arm 50 is associated with a contact on one end of a conductor 52, the other end of this conductor being connected to the binding post 44. 75 designates a valve barrel having connected thereto a pipe or conduit 76 leading from a source of fuel supply and an exit pipe 77 leading to the heating device. Rotatably mounted in the valve body 75 is a valve 78 which is connected by lever 79 to an arm 80. On one end of the arm 80 is attached a solenoid core 81 which co-operates with a solenoid 82, this solenoid being connected by conductors 83 and 84 to the conductor 51 associated with the switch 49. At the other end of the member 80 is connected a solenoid core 85, which is associated with a solenoid 86 connected by conductors 87 and 88 to the conductor 52 associated with the switch 50. It will be obvious that when the switch 49 closes the circuit with the conductor 51 that the solenoid 82 will be energized to pull the solenoid core 81 inward with respect to such solenoid and rotate a valve 78 to cut off the supply of fuel through the valve body 75 and that when the switch 50 closes the circuit above referred to, that a circuit is also closed through the solenoid coil 86 which attracts the solenoid core 85, rotating the valve 78 and allowing a flow of heating fluid from the pipe 76 to the pipe 77. The circuit diagram just described is for convenience of illustration only and is not to be understood as being the complete circuit arrangement with which the device is associated. It is intended by this device to control the operation of shutoff valves, either directly or indirectly, for the purpose of controlling the flow of fuel to a heating device and it is to be considered that the switch arm 49 acts as a means for completing the break point in a circuit by means of which the flow of fuel will be shut off. Further, the switch arm 50 is considered to be a break point in a circuit for controlling the turning on of fuel from a source of supply to a heating device.

In view of the above description, the operation of my device is as follows, it being assumed that the thermostat is constructed and arranged as above described and as illustrated in the drawings. We will assume that the indicating pointer 28 has been set to register with the indication 50 on the graduated scale on the front of the body 10 which is understood to mean that a minimum temperature of 50° is to be permitted in the room or enclosure in which the thermostat is located. This moving of the indicator 28 into registry with the indication 50 will cause a rotative movement of the arm 27 about the pivot screw 26 and, therefore, a bodily rotative movement of the energizing coils 40 about the pivot screw 26 as a center, thus bringing the rounded ends of the screws 39 into the proper position relative to the members 23 attached to the straight portion 22 of the thermostat element 21. Assuming the temperature of the room or enclosure to be well above the 50 mark, and assuming that, under these circumstances, the switch arm 49 is in engagement with its contact while the switch arm 50 is out of engagement with its contact. As the temperature of the room or enclosure increases, the portion 22 of the thermostat element 21 will move to the right until it gradually comes into engagement with the screw 39 of the right hand coil. Immediately the slightest contact is made between the portion 23 and the screw 39, a circuit will be closed from the source of current 47 through the conductor 48, switch arm 49, associated contact, conductor 51, conductor 84, solenoid 82, conductor 83 conducting plate 41, energizing coil 40, screw 39, plate 23, thermostat element 21, support 15, contact plates 17 and 45, and back to the source of current 47. The plates 23, being of magnetic material, will be drawn sharply against the right hand screw 39 and will remain positively in such position until the circuit through the magnet coils 36 is broken, which event may be arranged to take place a certain length of time after the flow of fuel has been shut off from the heating device and it will be assumed, and such is the case, that the flow of fuel will be immediately shut off from the heating device when the circuit through the energizing coil 40 is completed by the engagement of the plate 23 with the screw 39. After the flow of fuel has been shut off, the room or other enclosure in which the thermostat is located will naturally cool off and it is assumed that, after a certain period of time, the switch arm 49 moves out of engagement with its associated contact while the switch arm 50 will move into engagement with its associated contact. If the temperature of the room or other enclosure decreases to a point below the 50° mark, the portion 22 of the thermostatic element 21 will move to the left, as viewed in Fig. 1, until it comes gradually into engagement with the screw 39 on the left hand coil. The switch arm being assumed to be in engagement with its associated contact, as soon as the portion 23 comes into engagement with the screw 39, a circuit will be closed which will cause the turning on of the flow of fuel through the heating apparatus and it is assumed that, at a certain length of time after this fuel is turned on, the switch arm 50 will move out of engagement with its associated contact while the switch arm 49 will move into engagement with its associated contact ready for the next cycle of operations.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

An improved thermostat comprising a thermostatic element having one end fixed and with the free end movable substantially in the arc of a circle, an electromagnet arranged on each side of the free end of the thermostatic element, each electromagnet being provided with a fixed hollow core, an adjustable plug in each of the hollow cores and lying adjacent to the free end of the thermostatic element, an adjustable contact point in each of the adjustable plugs, the contact constituting one terminal of the electromagnet and a source of current connected to the other terminal of said electromagnet through a temporarily closed break point, the thermostatic element constituting means for closing a second break point in the energizing circuit.

In testimony whereof, I have signed my name to this specification.

EUGENE T. VINCENT.